Feb. 9, 1926.

M. J. BEAMER 1,572,835

SKIRT MEASURING DEVICE

Filed July 3, 1925    2 Sheets-Sheet 1

INVENTOR.
Minnie J. Beamer,
BY
Geo. F. Kimmel, ATTORNEY.

Feb. 9, 1926.
M. J. BEAMER
SKIRT MEASURING DEVICE
Filed July 3, 1925   2 Sheets-Sheet 2
1,572,835
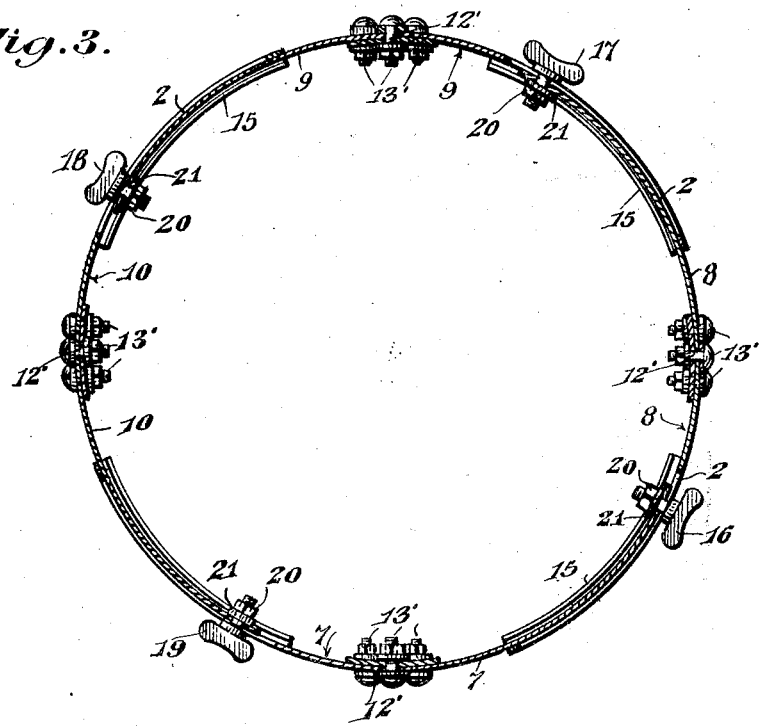
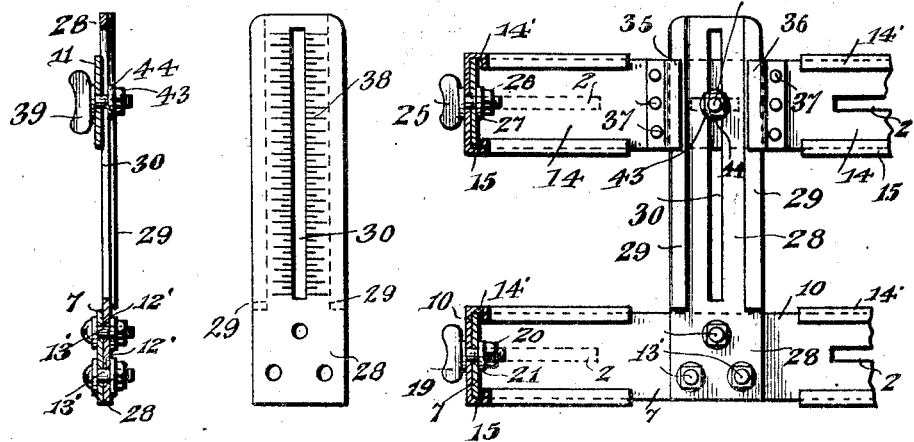
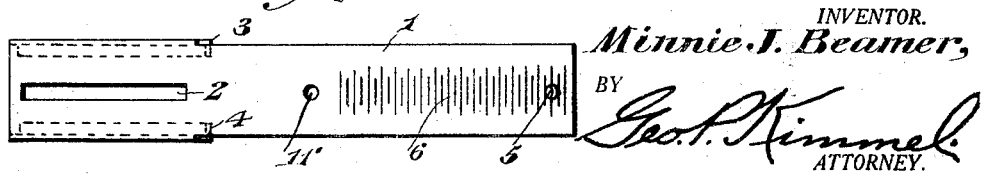
INVENTOR.
Minnie J. Beamer,
BY Geo. P. Kimmel
ATTORNEY.

Patented Feb. 9, 1926.

1,572,835

UNITED STATES PATENT OFFICE.

MINNIE J. BEAMER, OF FLINT, MICHIGAN.

SKIRT-MEASURING DEVICE.

Application filed July 3, 1925. Serial No. 41,333.

*To all whom it may concern:*

Be it known that I, MINNIE J. BEAMER, a citizen of the United States, residing at Flint, in the county of Genesee and State of Michigan, have invented certain new and useful Improvements in Skirt-Measuring Devices, of which the following is a specification.

This invention relates to a skirt measuring device, and has for its object to provide, in a manner as hereinafter set forth, a device of such class for conveniently and accurately measuring the length and circumference of a skirt.

Further objects of the invention are to provide in a manner as hereinafter set forth, a device of the class referred to which is simple in its construction and arrangement, strong, durable, thoroughly efficient in its use, readily assembled and comparatively inexpensive to manufacture.

With the foregoing and other objects in view the invention consists of a novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views—

Figure 3 is a sectional plan view.

Figure 4 is a section on line 4—4, Figure 1.

Figure 5 is a section on line 5—5, Figure 2.

Figure 6 is a front elevation of one of the height gauges.

Figure 7 is an elevation of one of the upper or lower circumferential gauges.

Figure 1:
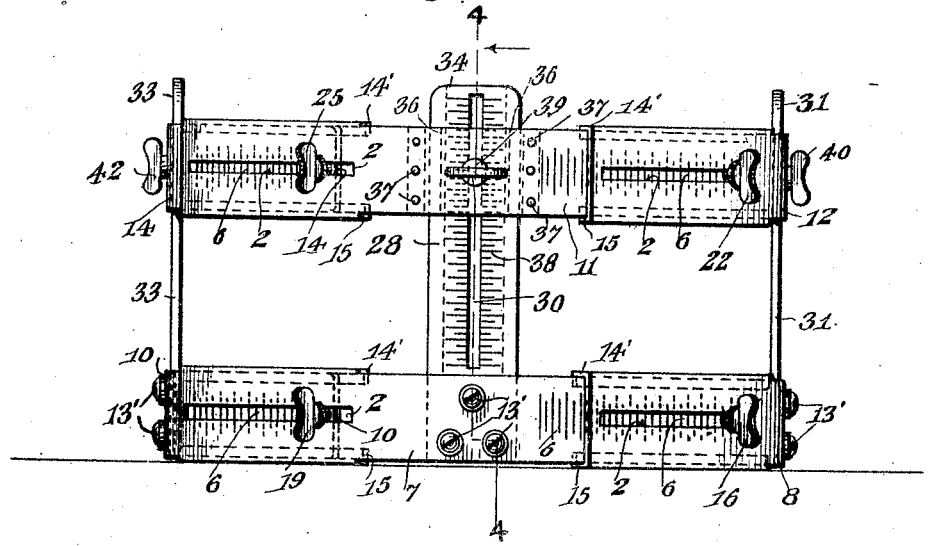
Figure 1 is an elevation of the skirt measuring device, in accordance with this invention, showing its adaptation in connection with the lower portion of a skirt.
Figure 2:
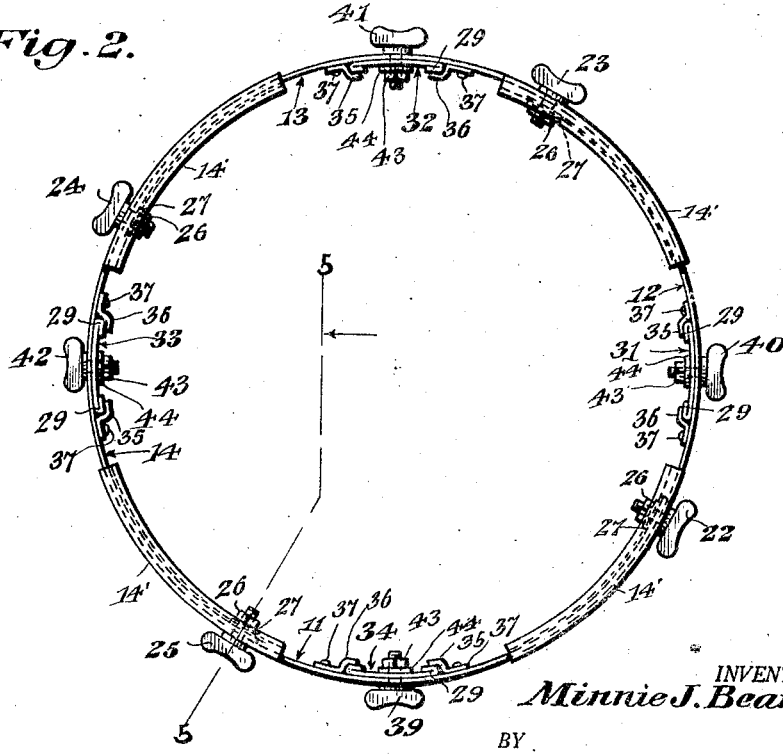
Figure 2 is a plan view of the device.

A skirt measuring device in accordance with this invention, is adjustable circumferentially and vertically with respect to the skirt and comprises a set of four upper and a set of four lower circumferential gauges and a set of four height gauges, as well as guides for the height gauges, means for adjustably connecting the circumferential gauges of each set together, means for fixedly securing the gauges of the lower set to the height gauges, and means for adjustably and slidably connecting the height gauges to the upper set of circumferential gauges.

As each of the gauges of each set of circumferential gauges is substantially of the same construction but one will be described, as the description of one will apply to the other. Each of said gauges consists of a sheet metal strip 1 of the desired length, thickness and width and said strip at one terminal portion thereof is formed with a lengthwise extending slot 2, and further formed at the top edge of said terminal portion with a rearwardly disposed and downwardly extending angle-shaped flange 3, and at the bottom edge of said terminal portion with a rearwardly disposed and upwardly extending angle-shaped flange 4. The strip 1 at that end opposite the end provided with the flanges 3, 4, is formed with an opening 5, and said strip 1 between its center and that end formed with the opening 5 has its outer face provided with scale graduations 6.

The gauges of the lower set are generally referred to by reference characters 7, 8, 9 and 10. The gauges of the lower set provide the base of the device. The gauges of the upper set are generally referred to by the reference characters 11, 12, 13 and 14.

The differences in construction between the gauges of the upper set and the gauges of the lower set is that each gauge of the upper set is provided with a centrally disposed opening 11', which is not employed in the gauges of the lower set and each gauge of the lower set is formed centrally thereof with a series of openings 12' for the passage of holdfast devices 13'. The openings 12' are not provided in the gauges of the upper set. The purpose of the holdfast devices 13' will be presently referred to.

The angle-shaped flanges of each of the circumferential gauges provide, in connection with the strip 1 with which the flanges are integral, a pair of opposed channels 14', 15.

With respect to the gauge members of the lower set, the gauge member 7 is slidably mounted in the channels 14' and 15 of the gauge member 8, the latter is slidably mounted in the channels 14' and 15 of the gauge member 9, the latter is slidably mounted in the channels 14' and 15 of the gauge member 10 and the latter is slidably mounted in the channels 14' and 15 of the gauge member 7. Further with respect to the gauge members of the lower set, the scale graduations 6 of the member 7 are exposed through the slot 2 of the member 8, the scale graduations 6 of the member 8 are exposed through the slot 2 of the member 9, the scale graduations of the latter are exposed through the slot 2 of the member 10 and the scale graduations 6 of the latter are exposed through the slot 2 of the member 7. The gauge members of the lower set are adjustably connected together and the connection is had through the medium of four wing bolts indicated at 16, 17, 18 and 19 and each of said bolts carries a securing nut 20 and a washer 21. The bolts extend through the slots 2 and the openings 5 and the washers 21 are arranged against the rear of the gauge members or in other words interposed between the nuts 20 and the inner faces of the gauge members. The slots 2 provide means whereby the gauge members can be adjusted circumferentially with respect to the skirt, and after the desired adjustment has been obtained, the bolts are maintained in fixed position by the nuts 20, which are adjusted to bind the washers 21 against the members and further to bind the members against each other.

The gauge members of the upper set are adjustably connected together in the same manner as the gauge members of the lower set, and the wing bolts employed in connection with the upper set are indicated at 22, 23, 24, and 25, the nuts at 26 and the washers at 27.

With respect to the gauge members of the upper set, the member 11 is slidably mounted in the channels 14' and 15 of the member 12 and the scale graduations 6 of the member 11 are exposed through the slot 2 in the member 12, the latter is slidably mounted in the channels 14' and 15 in the member 13 and the scale graduations 6 of the member 12 are exposed through the slot 2 of the member 13, the latter is slidably mounted in the channels 14' and 15 of the member 14 and the scale graduations 6 of the member 13 are exposed through the slot 2 of the member 14, and the latter is slidably mounted in the channels 14' and 15 of the member 11 and the scale graduations 6 of the member 14 are exposed through the slot 2 of the member 11.

The number of guides of the height set is four and as each of these guides is of the same construction but one will be described, as the description of one will apply to all others. Each of the height guides consists of a vertically disposed rectangular support 28 of substantial width and height, and formed at its rear with a pair of vertically disposed reinforcing ribs 29 extended from the upper end of a support to a point removed from the lower end thereof. Each of the supports 28 centrally thereof is formed with a lengthwise extending slot 30, which starts from a point in proximity to the upper end of the support and terminates at a point slightly above the lower ends of the ribs 29. The supports 28 are arranged equidistant apart and positioned within both sets of circumferential gauges. The height gauges are referred to generally by the reference characters 31, 32, 33 and 34. The lower end of the gauge 31 is fixedly secured to the gauge member 8 by the holdfast devices 13'. The lower end of gauge 32 is fixedly secured by the holdfast devices 13' to the gauge member 9. The lower end of the gauge 33 is fixedly secured to the gauge member 10 and the lower end of the gauge 34 is fixedly secured to the gauge member 7. As the gauge members of the lower set are fixedly secured to the gauge members of the height set, the said lower set is not vertically adjustable but provides, as before stated, the base of the device.

Each of the gauge members of the upper set is provided with a pair of spaced guides. The guides of each pair are oppositely disposed with respect to each other and are indicated at 35, 36 and are fixedly secured to an upper gauge member by the holdfast devices 37. Each pair of guides are secured to the rear face of an upper gauge member and overlap one of the height gauges of the set, see Figure 5. The pairs of guides provide means for connecting the height gauges to the gauges of the upper set of circumferential gauges, and set up a sliding connection between the upper set of gauges and the height gauges. With respect to the upper set of gauges, the gauge member 11 is slidably connected to a height gauge 34, the member 12 to the height gauge 31, the member 13 to the height gauge 32 and the member 14 to the height gauge 33.

The outer face of each of the height gauges, at each side of the slot 30 is provided with a set of gauge graduations 38. The height gauges are adjustably connected to the gauges of the upper set of circumferential gauges and for such purpose four wing bolts are employed and which are indicated at 39, 40, 41 and 42 and each of which is provided with a securing nut 33 and a washer 44. The bolt 39 extends through the opening 11' in the member 11 and through the slot 30 in the member 34. The bolt 40 extends through the opening 11' in the member 12 and through the slot 30 in the member 31. The bolt 41 extends through the opening 11' in the member 13 and through the slot 30 in the member 32 and the bolt 42 extends through the opening 11' in the member 14 and through the slot 30 in the member 33. The washers 44 are interposed between the nuts 43 and the height gauges. The slots 30 when the bolts 39 to 42 are released, permit of the bodily adjusting vertically of the upper set of circumferential gauges.

When the bolts 16 to 19 are released, the gauge members of the lower set can be adjusted to increase or decrease the diameter of the base formed by said members, so as to measure the circumference of a skirt, and a like operation is had when the bolts 22 to 25 of the upper set of gauge members are loosened.

Owing to the foregoing arrangement and construction of parts, a skirt measuring device is set up which not only can be adjusted to measure a skirt circumferentially, but also as to measure the desired height of skirt, and it is thought the many advantages of a measuring device in accordance with this invention, and for the purpose set forth, can be readily understood, and although the preferred embodiment of the invention is as illustrated and described, yet it is to be understood that changes in the details of the construction can be had which will fall within the scope of the invention as claimed.

What I claim is:

1. A measuring device for the purpose set forth comprising a series of vertically disposed height gauges, a lower set of circumferential gauges interengaging with each other and further adjustably connected together, means for fixedly securing each of the gauges of said set to the lower end of a height gauge, an upper set of circumferential gauges interengaging with each other and further adjustably connected together and bodily adjustable vertically with respect to said height gauges, means for adjustably connecting each of the gauges of the upper set to a height gauge, and each of the gauges of said sets provided with a lengthwise extending slot and its outer face formed with scale graduations, the scale graduations of a gauge of one set exposable through the slot of an adjacent gauge of the same set.

2. A measuring device for the purpose set forth comprising a series of vertically disposed height gauges, a lower set of circumferential gauges interengaging with each other and further adjustably connected together, means for fixedly securing each of the gauges of said set to the lower end of a height gauge, an upper set of circumferential gauges interengaging with each other and further adjustably connected together and bodily adjustable vertically with respect to said height gauges, means for adjustably connecting each of the gauges of the upper set to a height gauge, a pair of oppositely disposed guide members carried by each of the gauges of the upper set and slidably connecting a height gauge to a gauge of the upper set, and each of the gauges of said sets provided with a lengthwise extending slot and its outer face formed with scale graduations, the scale graduations of a gauge of one set exposable through the slot of an adjacent gauge of the same set.

In testimony whereof, I affix my signature hereto.

MINNIE J. BEAMER.